US006871076B2

United States Patent
Samn

(10) Patent No.: US 6,871,076 B2
(45) Date of Patent: Mar. 22, 2005

(54) METHOD AND SYSTEM FOR AUTOMATICALLY ADJUSTING LOCATION BASED SYSTEM INFORMATION IN A MOBILE COMPUTER

(75) Inventor: Jonathan Samn, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 428 days.

(21) Appl. No.: 10/195,213

(22) Filed: Jul. 11, 2002

(65) Prior Publication Data

US 2004/0192332 A1 Sep. 30, 2004

(51) Int. Cl.$^7$ ............................................... H04Q 7/20
(52) U.S. Cl. ........................ 455/456.1; 455/456.6; 455/432.2; 379/88.17; 379/265.09
(58) Field of Search ........................ 455/456.1–456.2, 455/456.3, 456.6, 458, 37, 412.1–412.2, 432.2–432.3, 500, 556, 557, 414.1; 395/88.17, 265.09

(56) References Cited

U.S. PATENT DOCUMENTS

| | | | | |
|---|---|---|---|---|
| 4,969,209 A | | 11/1990 | Schwab | 455/158 |
| 5,848,373 A | * | 12/1998 | DeLorme et al. | 701/200 |
| 6,147,986 A | * | 11/2000 | Orsic | 370/349 |
| 6,154,172 A | | 11/2000 | Piccionelli et al. | 342/357.1 |
| 6,154,745 A | * | 11/2000 | Kari et al. | 707/100 |
| 6,154,777 A | | 11/2000 | Ebrahim | 709/227 |
| 6,256,503 B1 | | 7/2001 | Stephens | 455/456 |
| 6,317,484 B1 | | 11/2001 | McAllister | 379/88.02 |
| 6,356,761 B1 | * | 3/2002 | Huttunen et al. | 455/456.1 |
| 6,374,108 B1 | | 4/2002 | Jakobsen et al. | 455/432 |
| 6,650,901 B1 | * | 11/2003 | Schuster et al. | 455/456.1 |
| 6,665,715 B1 | * | 12/2003 | Houri | 709/223 |
| 6,810,259 B1 | * | 10/2004 | Zhang | 455/456.5 |
| 2002/0164999 A1 | * | 11/2002 | Johnson | 455/456 |
| 2003/0008662 A1 | * | 1/2003 | Stern et al. | 455/456 |
| 2003/0134645 A1 | * | 7/2003 | Stern et al. | 455/456 |
| 2004/0179537 A1 | * | 9/2004 | Boyd et al. | 370/395.54 |

\* cited by examiner

*Primary Examiner*—CongVan Tran
(74) *Attorney, Agent, or Firm*—Andrea Pair Bryant; David A. Mims, Jr.

(57) ABSTRACT

There is disclosed a method, system and program product for automatically adjusting location based system information in a mobile computer to reflect the time zone where a user of the mobile computer connects to the Internet, as a function of the geographic location of the IP address of the connection, as seen by an address server remote from the connection place. A table mapping the IP address of the computer with each other IP address where the mobile computer connects to the Internet and corresponding time zone data is constructed with minimal user interaction each time a new Internet connection is made. Thereafter, anytime the user connects to the Internet at an IP address in the table, location based system information is appropriately adjusted with no intervention by the user.

15 Claims, 2 Drawing Sheets

| IPI | Time Zone | IPA | Location | Message |
|---|---|---|---|---|
| 123.45.67.89 | GMT-06:00 | 87.54.123.60 | Office | I'm in the office |
| 95.67.23.145 | GMT-06:00 | 168.67.123.211 | Home | Working From Home |
| 68.43.253.251 | GMT-05:00 | 128.128.234.67 | New York Site | In New York Mobility Center |

METHOD AND SYSTEM FOR AUTOMATICALLY ADJUSTING LOCATION BASED SYSTEM INFORMATION IN A MOBILE COMPUTER

BACKGROUND OF THE INVENTION

1. Field of the Invention

The present invention relates to information handling systems. More particularly, it relates to automatically causing location based system information adjustments in a mobile computer to reflect a change in physical location, such as the time zone where a user of the mobile computer is geographically located when connected to the Internet.

2. Description of the Prior Art

Notebook and other mobile computer systems are well known and widely used, frequently during travel by a user. Such travel often involves crossing one or more time zones. Changing the clock is currently the responsibility of the user. Such a time change to the clock of the mobile computer is usually accomplished via a user initiated graphical user interface (GUI). Busy travelers sometimes forget to make allowances for time zone changes, resulting in confusion at best and missed appointments and the like in worse cases.

Thus, it would be desirable to have location based system information adjustment in a manner in which changes occur with minimal intervention by a user of a mobile computer.

SUMMARY OF THE INVENTION

The present invention overcomes the shortcomings of prior art techniques for changing location based system information in a mobile computer by providing a method, system and computer program product for automatically changing location information as a function of the geographic location of the user when connected to the Internet, or other network including the Internet. This advantageous result is accomplished through the interaction of software in the mobile computer and a remote address server able to detect an Internet Protocol (IP) address through which the mobile computer is connected to the network. The address server reports the IP address of the mobile computer to the mobile computer. The so reported IP address is stored in a table on the mobile computer. This table resides in a portion of memory in the mobile computer for correlating, inter alia, IP addresses and their time zones. Each table entry contains data denoting the IP address as seen by the address server, which IP address may be that of a router or the actual IP address given to the mobile computer, and data denoting the IP address as seen by the mobile computer. Mapped to those IP addresses is the time zone and optional, user supplied, location designations and associated messages or the like.

Once the IP address table is built, it is checked and updated when the user of the mobile computer next connects to the Internet. If the mobile computer detects a connection in which the IP address pair does not match an existing table entry, a new entry is added to the table and the user is prompted to supply the current time zone, location designation and any associated message. Since business travelers often revisit some places, such as home or a headquarters, on a regular basis the present invention enables the quick and automatic adjustment of the clock and location based system information in the mobile computer. Location based system information includes the system time zone, status messages, and Internet connection type. Location based system information may vary with the particular characteristics of the mobile computer employed by the user.

BRIEF DESCRIPTION OF THE DRAWING

The foregoing and other features and advantages of the present invention will become more apparent from the following description of the best mode for carrying out the invention taken in conjunction with the various figures of the drawing in which like numerals and symbols are used throughout to designate like elements, and in which.

DETAILED DESCRIPTION OF THE INVENTION

Figure 1:
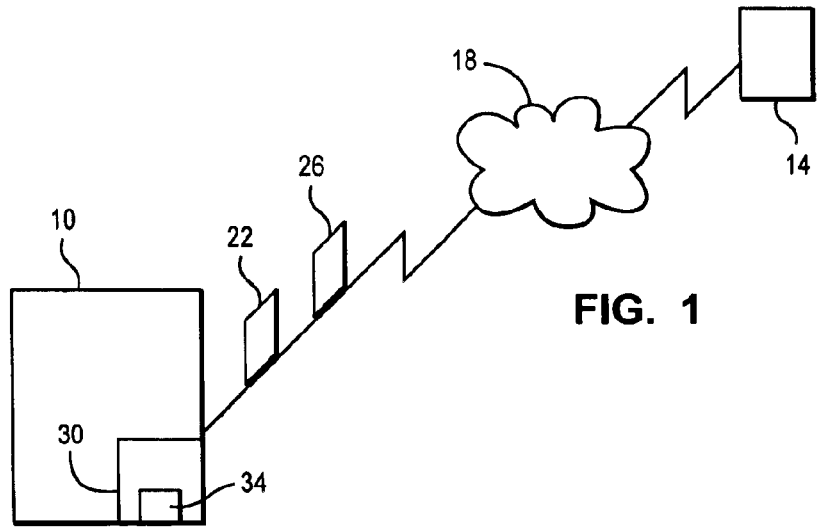
FIG. 1 is a high level block diagram of an information handling system in which the present invention may be used.

Refer now to FIG. 1 which illustrates the major components of an information handling system 2 in which the present invention may be practiced. The networked computer system of FIG. 1 includes at least a mobile computer 10 and a server 14, each connected to and accessible via the Internet 18. Mobile computer 10 is a conventional notebook computer, or the like, such as an IBM Thinkpad available from the IBM Corporation. Of course, those skilled in the art will appreciate that mobile computer 10 may also be an Internet enable Personal Digital Assistant (PDA). Server 14 may be any server having the ability to report incoming IP addresses. As is well understood, mobile computer 10 may be connected to the Internet directly or through some other means such as a router 22 and/or a firewall 26. Mobile computer 10 may also employ a wireless connection to Internet 18. Mobile computer 10 includes a memory 30 in which a table 34, in accordance with present invention, is constructed and maintained for subsequent reference when computer 10 is again connected to the Internet 18.

The present invention contemplates having server 14 appropriately programmed, upon request from mobile computer 10, to determine the IP address where mobile computer 10 is connected to, as seen by server 14, the Internet. The IP address, IPI, detected by server 14 via the Internet may differ from the actual IP address, IPA, of computer 10. Both addresses, whether or not different, are included in table 34 along with the current time zone supplied by a user of mobile computer 10 in response to a prompt issued in accordance with the method of the invention. The time zone supplied by the may be expressed as a function of Greenwich Mean Time (GMT).

Figure 2:
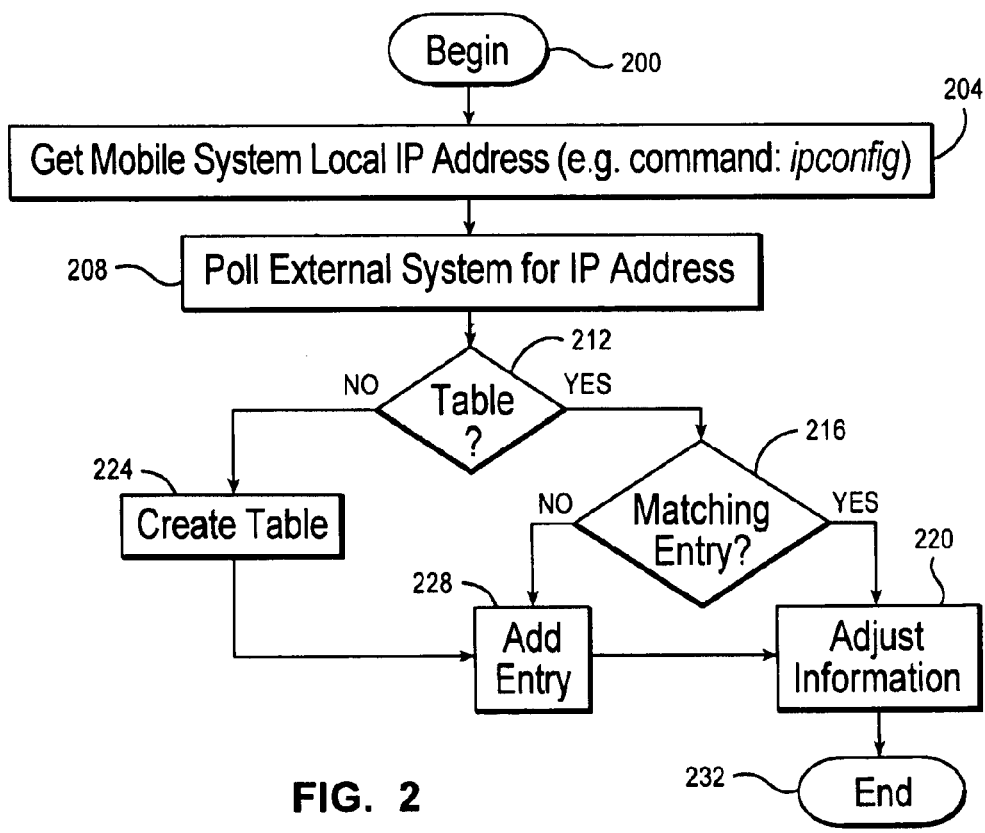
FIG. 2 illustrates the major steps in the process of the invention.

Refer now to FIG. 2 which shows the major steps comprising the method of the invention. The process begins at step 200 upon connection of computer 10 to the Internet 18. Step 204 represents obtaining the actual IP address, IPA, of mobile computer 10. One way this step may be accomplished is to issue an ipconfig command, which as is well understood in the art, returns the IP address then associated with mobile computer 10. At step 208 the IP address of that connection is found by polling server 14, which returns the IP address, IPI, of the Internet connection of computer 10. Polling server 14 may entail an active server page (ASP) which reports the IP address so that mobile computer 10 may retrieve it. A determination is then made at step 212 if table 34 exists in memory 30 of computer 10. If there is a table 34, then at step 216, it is searched to see if the current IP address, IPI, returned from server 14 is already present in an entry, that is, table 34 is searched for an entry containing, at least, an IPA, IPI pair matching those currently under consideration. If there is a matching entry in table 34, the time zone supplied by the user when that entry was made is used to adjust the location based system information of computer 10 at step 220.

If at test 212 no table 34 is found, then at step 224 table 34 is created. Such a situation could occur when a mobile computer 10, enabled to utilize the present invention is connected to the Internet the first time after installation of software embodying the present invention. Control then passes to step 228 where an entry mapping the current IPA, IPI pair.

If there is found at step 216 no entry in table 34 corresponding to the current IPI, IPA combination, an entry is made at step 228 to table 34 mapping IPI to the actual IP address IPA of computer 10.

In either instance, first or subsequent connection to the Internet, the user of mobile computer 10 is prompted to supply an indication of the time zone of the geographic location of IPI, which time zone indication is placed in table 34 as part of step 228 before performing the location based information adjustment at step 220. The process of the invention ends at terminal 232.

Figures 3, 4:
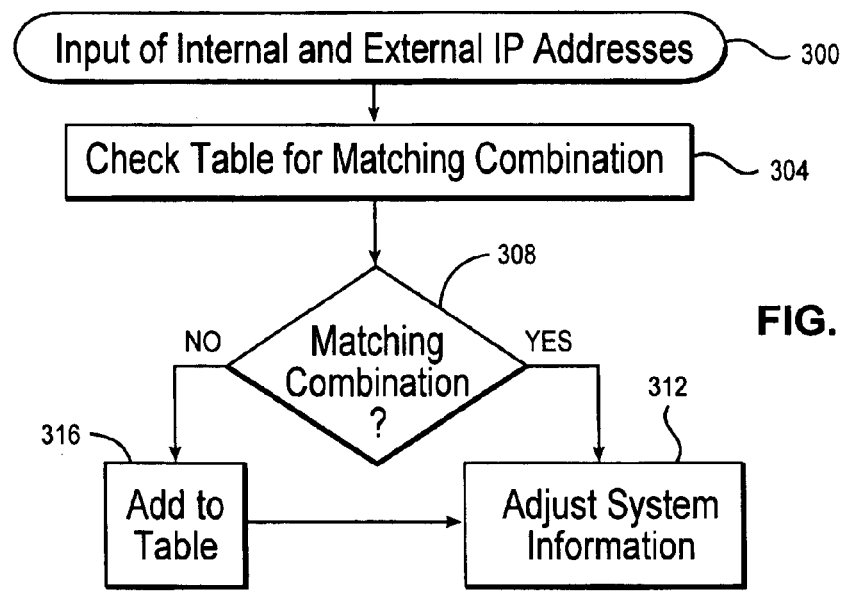
FIG. 3 shows the logic followed in the update of table 34 of FIG. 1.
FIG. 4 illustrates in more detail the IP Address Table 34 of FIG. 1.

Refer now to FIG. 3 which depicts the steps always performed upon a subsequent connection to the Internet of a mobile computer 10 equipped with the present invention. Steps 204 and 208, FIG. 2, are automatically performed. Thus, at step 300, an IPA, IPI pair has already been obtained. It will be appreciated by those having skill in the art that while the present invention has been described having reference to networked system 2, FIG. 1, a wireless connection between mobile computer 10 and the Internet may be used. Step 304 represents a check by the method of the invention within table 34 for an entry containing the same IPA, IPI pair combination of step 300. Test 308 determines whether such a matching entry is indeed present. If so, control branches to step 312 where location based system information in mobile computer 10 is appropriately adjusted.

As previously described in connection with FIG. 2, if no matching entry having the IPI, IPA pair of step 300 is found at step 308, then at step 316, a new entry is added to table 34, the contents of which entry comprises at least a mapping of the current IPI, IPA pair and a user supplied time zone indication.

Both add entry steps, 220 (FIG. 2) and 316 (FIG. 3) include interactive communication with the user of mobile computer 10, preferably via a GUI. An appropriate add entry sequence would include storing IPA and IPI and thereafter prompting the user to enter a time zone designation which is also stored. Optionally, the user may be prompted to supply a location description, status message and/or the like which is/are also stored as part of the new entry in table 34.

The adjustment system information, 220 (FIG. 2) and 312 (FIG. 3), may be accomplished using techniques known in the art. Specific programs may be designed or Java scripts may be written. A commercially available application, Timezone.exe, is also suitable for use with the present invention.

FIG. 4 illustrates possible contents of table 34. Headings shown and element order are, of course, a matter of designer choice. Table 34 is developed through the interaction of software, resident in computer 10, and server 14. As shown, table 34 contains five columns. The first three, IPI, Time Zone, and IPA are necessary to the operation of the present invention. The next two, Location and Message, are optional. Of course other information deemed pertinent to a given application may also be stored. Location and Message may be entered following prompts to the user of mobile computer 10 to provide same, as is well understood. Three rows are illustrated representing three geographic locations where the user of mobile computer 10 has connected to the Internet. Additional rows would be present for any other places visited by the user.

The present invention may be utilized in conjunction with a real-time chat, conference application such as Lotus Sametime, a product of the IBM Corporation. This product enables communication among multiple users in multiple geographic locations. Frequently these users are employees or associates of an enterprise spanning many time zones. Use of the present invention along with the optional location and status messages lets each communication session participant become easily aware of the other participants' real-time situation since a given chat client status is set as a function of the geographic location of a client's mobile computer location. For travelers who find themselves repeatedly in the same venues, life with their mobile computers is simplified because minimal input is required only the first time at a destination in order for their mobile computers equipped with the present invention to automatically adjust location based system information within their computers on each subsequent visit.

While the present invention has been described having reference to a particular preferred embodiment, those having skill in the art will appreciate that the above noted and other modifications in form and detail may be made without departing from the spirit and scope of the following claims.

What is claimed is:

1. A method for automatically adjusting location based system information in a mobile computer upon use thereof at a location different than its place of usual Internet connection, comprising:

upon connection to a network including the Internet, polling a server to find an IP address as seen by the Internet for said computer;

searching for an entry in a table, in said computer, containing said IP address from the Internet;

if no entry is found, adding a table entry containing a mapping of said IP address from the Internet with an actual IP address of said computer;

prompting a user to supply a time zone, correlated to a present geographic location, for inclusion in said table entry; and adjusting location based system information in said computer using said time zone correlated to said IP address from the Internet and said computer IP address.

2. The method of claim 1 wherein said adding step additionally comprises:

determining whether a table exists; and if not, building a table.

3. The method of claim 1 wherein said adding step additionally comprises:

prompting a user of said computer to supply a location designation indicative of a geographic location corresponding to said connection.

4. The method of claim 1 wherein said polling step comprises:

contacting said server; and in response to said contacting step, reporting said IP address to said computer.

5. The method of claim 1 wherein said adjusting step includes:

changing, as needed, status messages in configuration files of said computer; and setting time in a clock in said computer.

6. Apparatus for automatically adjusting location based system information in a mobile computer upon use thereof at a location different than its place of usual Internet connection, comprising:

means active upon connection to a network including the Internet for polling a server to find an IP address as seen by the Internet for said computer;

means for searching for an entry in a table, in said computer, containing said IP address from the Internet;

means active if no entry is found for adding a table entry containing a mapping of said IP address from the Internet with an actual IP address of said computer;

means for prompting a user to supply a time zone, correlated to a present geographic location, for inclusion in said table entry; and means for adjusting location based system information in said computer using said time zone correlated to said IP address from the Internet and said computer IP address.

7. The apparatus of claim 6 wherein said means for adding additionally comprises:

means for determining whether a table exists; and means active if no table exists for building a table.

8. The apparatus of claim 6 wherein said means for adding additionally comprises:

interactive means for prompting a user of said computer to supply a location designation indicative of a geographic location corresponding to said connection.

9. The apparatus of claim 6 wherein said polling means comprises:

means for contacting said server; and means active in response to said means for contacting for reporting said IP address to said computer.

10. The apparatus of claim 6 wherein said means for adjusting includes:

means for changing, as needed, status messages in configuration files of said computer; and means for setting an appropriate time in a clock in said computer clock.

11. A computer program having data structures included on a computer readable medium for automatically adjusting location based system information in a mobile computer upon use thereof at a location different than its place of usual Internet connection, comprising:

means active upon connection to a network including the Internet for polling a server to find an IP address as seen by the Internet for said computer;

means for searching for an entry in a table, in said computer, containing said IP address from the Internet;

means active if no entry is found for adding a table entry containing a mapping of said IP address from the Internet with an actual IP address of said computer;

means for prompting a user to supply a time zone, correlated to a present geographic location, for inclusion in said table entry; and means for adjusting location based system information in said computer using said time zone correlated to said IP address from the Internet and said computer IP address.

12. The computer program of claim 11 wherein said means for adding additionally comprises:

means for determining whether a table exists; and means active if no table exists for building a table.

13. The computer program of claim 11 wherein said means for adding additionally comprises:

interactive means for prompting a user of said computer to supply a location designation indicative of a geographic location corresponding to said connection.

14. The computer program of claim 11 wherein said polling means comprises:

means for contacting said server; and means active in response to said means for contacting for reporting said IP address to said computer.

15. The computer program of claim 11 wherein said means for adjusting includes:

means for changing, as needed, status messages in configuration files of said computer; and means for setting an appropriate time in said computer.

* * * * *